(12) United States Patent
Rengakuji et al.

(10) Patent No.: US 8,050,518 B2
(45) Date of Patent: Nov. 1, 2011

(54) IMAGE PROCESSING APPARATUS AND METHOD FOR READILY IDENTIFYING IMAGE DATA SUITABLE FOR SUPER-RESOLUTION PROCESSING

(75) Inventors: Hideyuki Rengakuji, Koto-ku (JP); Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 11/550,235

(22) Filed: Oct. 17, 2006

(65) Prior Publication Data

US 2007/0098301 A1 May 3, 2007

(30) Foreign Application Priority Data

Oct. 27, 2005 (JP) .................................. 2005-313098
Sep. 6, 2006 (JP) .................................. 2006-241337

(51) Int. Cl.
*G06K 9/36* (2006.01)

(52) U.S. Cl. ........ 382/284; 382/100; 382/299; 396/310; 396/311

(58) Field of Classification Search .................. 382/100, 382/284, 300, 298, 299; 348/E5.053; 396/310, 396/311
See application file for complete search history.

(56) References Cited

U.S. PATENT DOCUMENTS

| | | | | |
|---|---|---|---|---|
| 5,920,342 A * | 7/1999 | Umeda et al. | ............. | 348/211.14 |
| 6,211,912 B1 * | 4/2001 | Shahraray | ................... | 348/228.1 |
| 6,330,344 B1 * | 12/2001 | Kondo et al. | .................. | 382/107 |
| 6,393,163 B1 * | 5/2002 | Burt et al. | ...................... | 382/294 |
| 6,731,825 B1 * | 5/2004 | Acampora et al. | ............ | 382/284 |
| 6,834,128 B1 * | 12/2004 | Altunbasak et al. | .......... | 382/284 |
| 7,085,323 B2 * | 8/2006 | Hong | ........................ | 375/240.25 |
| 7,106,914 B2 * | 9/2006 | Tipping et al. | ................ | 382/299 |
| 7,136,096 B1 * | 11/2006 | Yamagishi et al. | ......... | 348/218.1 |
| 7,583,860 B2 * | 9/2009 | Kuo et al. | ..................... | 382/300 |
| 2004/0008269 A1 * | 1/2004 | Zomet et al. | .................. | 348/252 |

FOREIGN PATENT DOCUMENTS

| | | |
|---|---|---|
| JP | 2002-112075 A | 4/2002 |
| JP | 2003-309763 A | 10/2003 |
| JP | 2004-186886 A | 7/2004 |
| JP | 2004-201247 A | 7/2004 |
| JP | 2004-297697 A | 10/2004 |
| WO | 2005/046221 A | 5/2005 |
| WO | 2005/046221 A1 | 5/2005 |

OTHER PUBLICATIONS

Sung Cheol Park, Min Kyu Park and Moon Gi Kang, "Super-Resolution Image Reconstruction: A Technical Overview", IEEE Signal Processing Magazine, IEEE, vol. 20 Issue 3, May 2003, pp. 21-36.*

* cited by examiner

Primary Examiner — Matthew Bella
Assistant Examiner — Eric Rush
(74) Attorney, Agent, or Firm — Canon USA Inc IP Division

(57) ABSTRACT

An image processing apparatus includes a determining unit that determines whether image capturing conditions concerning super-resolution processing are satisfied for each piece of image data, and an adding unit that adds data corresponding to a result of determination made by the determining unit to each piece of the image data.

12 Claims, 9 Drawing Sheets

FIG. 5
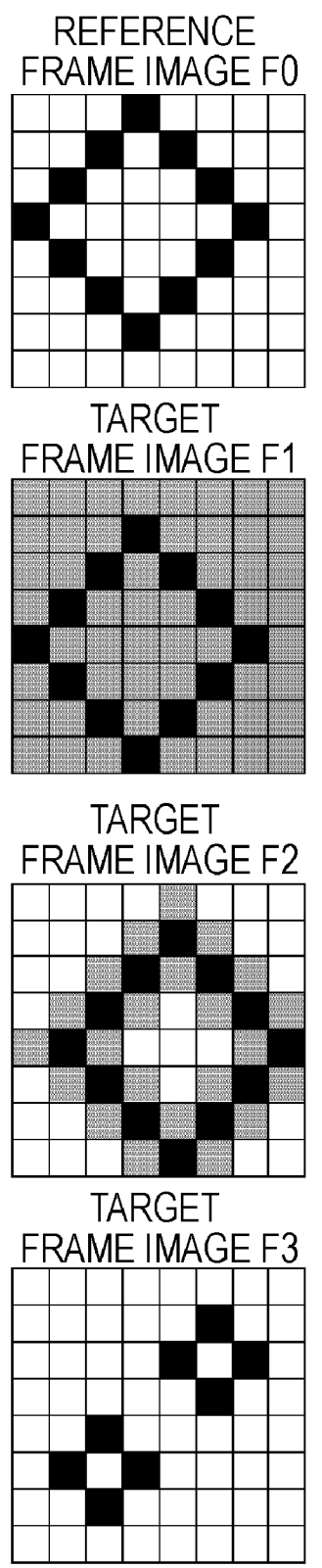
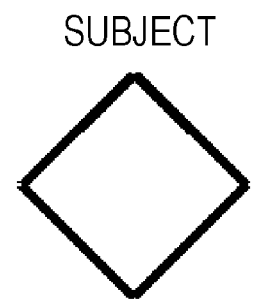

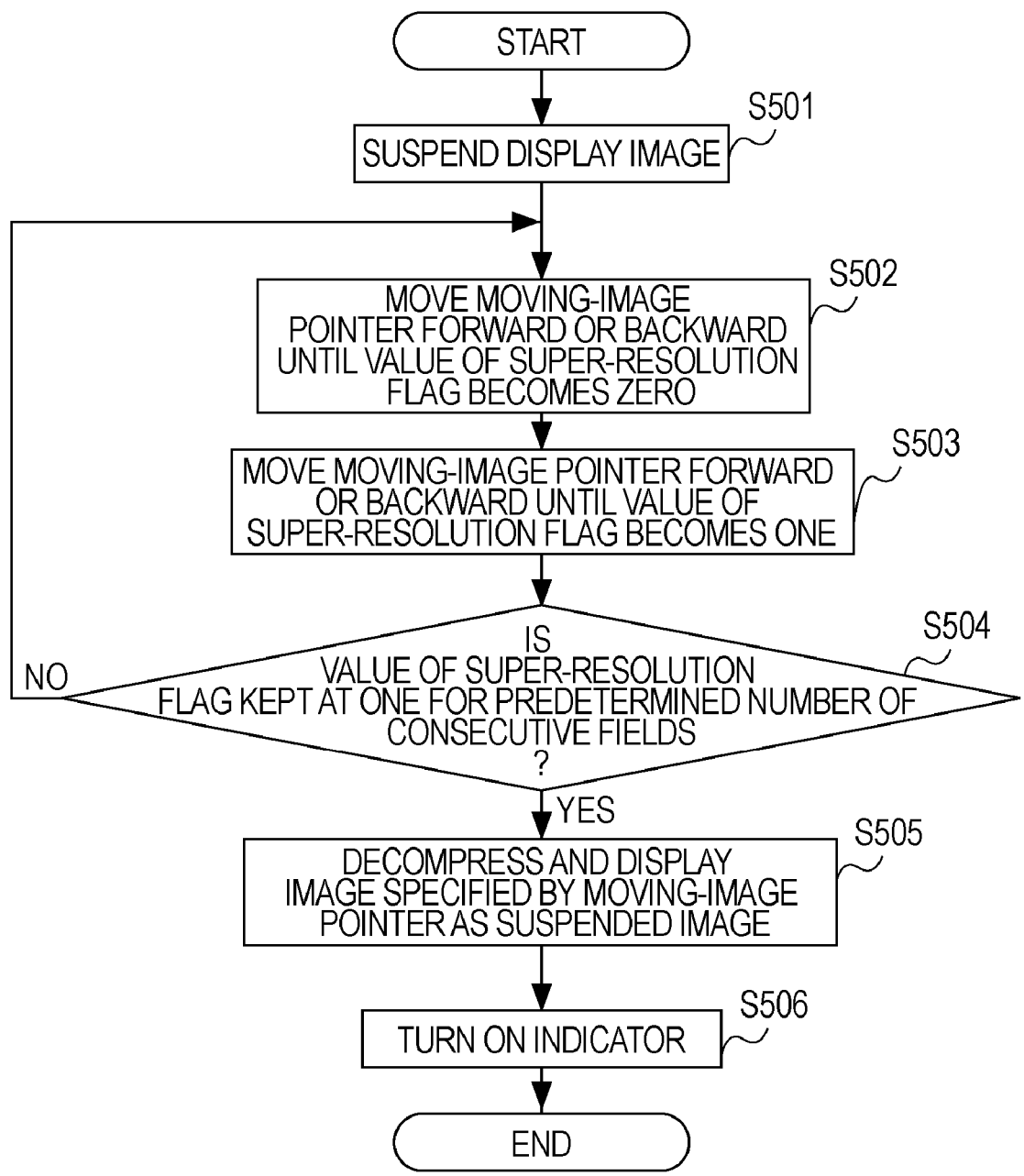

IMAGE PROCESSING APPARATUS AND METHOD FOR READILY IDENTIFYING IMAGE DATA SUITABLE FOR SUPER-RESOLUTION PROCESSING

BACKGROUND OF THE INVENTION

1. Field of the Invention

The present invention relates to an image processing apparatus and an image processing method for readily identifying image data suitable for super-resolution processing.

2. Description of the Related Art

Methods for super-resolution processing are known, in which a high-resolution image is generated from a plurality of images that may contain uncontrolled positional shifts caused by, for example, movement of a hand holding a camera.

However, in a case where still images are extracted from moving images, when the foregoing super-resolution processing is performed, super-resolution processing may not be correctly performed due to, for example, changes between scenes or changes caused by automatic exposure (AE) and automatic white balance (AWB) of a camera capturing images.

For example, in a scene where the level of detected value of light metering changes, changes occur in intense white areas and intense black areas in a subject. In such areas, shifts from a reference image are large. Thus, in super-resolution processing, since the number of frames that are used for interpolation decreases, the resolution may not be sufficiently improved. In particular, intense white areas tend to occur in the face part, and the resolution may not be sufficiently improved in a part corresponding to a main subject. In a scene where the level of detected white balance changes, the hue changes even in one subject. In such areas, shifts from a reference image are large. Thus, in super-resolution processing, since the number of frames that are used for interpolation decreases, the color resolution, the signal-to-noise (S/N) ratio, and the like may not be sufficiently improved.

Accordingly, the user needs to play back moving images and find the image of a scene suitable for super-resolution processing, where the level of detected value of light metering and the level of detected white balance are stable, out of the moving images to sufficiently achieve the effect of super-resolution processing. However, this is a cumbersome and time-consuming operation for the user.

SUMMARY OF THE INVENTION

In view of the aforementioned problems, an embodiment of the present invention is provided to readily identify image data suitable for high-resolution processing.

According to an aspect of the present invention, an image processing apparatus is provided, which includes a determining unit that determines whether image capturing conditions concerning resolution processing are satisfied for each piece of image data, the resolution processing generating a high-resolution image using a plurality of images, and an adding unit that adds data corresponding to a result of determination made by the determining unit to each piece of the image data.

Further features of the present invention will become apparent from the following description of exemplary embodiments with reference to the attached drawings.

BRIEF DESCRIPTION OF THE DRAWINGS

FIG. 5 is a second illustration showing frame images that are used in super-resolution processing and an image having been subjected to super-resolution processing.

FIG. 9 is a flowchart showing the process of searching for a scene suitable for super-resolution processing.

DESCRIPTION OF THE EMBODIMENTS

The details of an exemplary embodiment will now be described with reference to the attached drawings.

Figure 1:
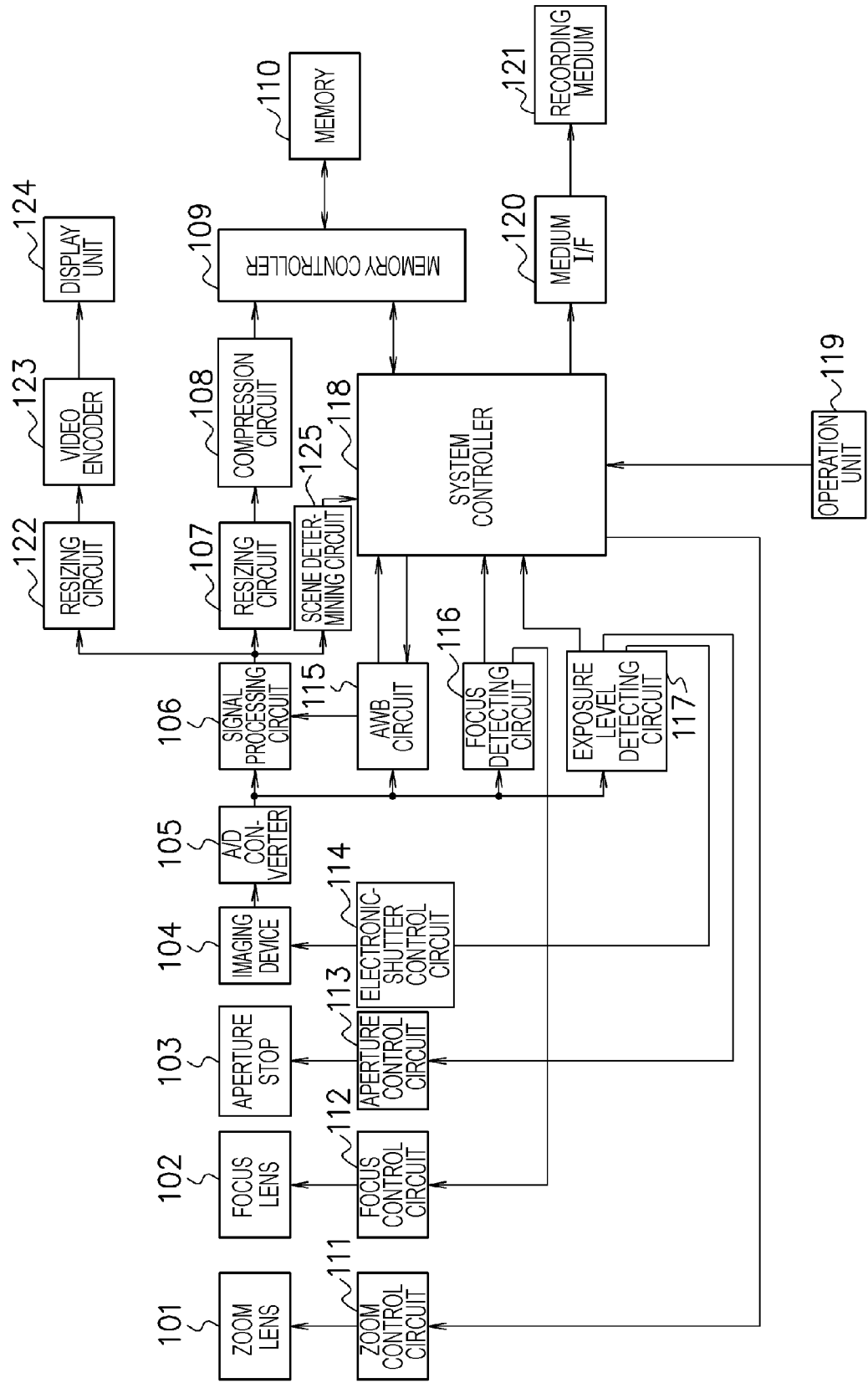
FIG. 1 is an illustration showing components of a moving-image recording unit in an image capturing apparatus according to an exemplary embodiment of the present invention.

FIG. 1 is an illustration showing components of a moving-image recording unit in an image capturing apparatus according to an exemplary embodiment. The components of the moving-image recording unit according to the present exemplary embodiment will now be described with reference to FIG. 1.

An image of a subject is formed on an imaging device 104 through a zoom lens 101, a focus lens 102, and an aperture stop 103. The image is converted to electrical signals by the imaging device 104, for example, a charge-coupled device (CCD). The electrical signals are converted to digital video signals by an analog-to-digital (A/D) converter 105. The digital video signals are subjected to Y/C separation, white-balance adjustment, aperture processing, gamma processing, and the like in a signal processing circuit 106 to be converted to luminance signals and color-difference signals and output.

The size of the output from the signal processing circuit 106 is resized to the size of moving images, for example, the video graphics array (VGA) size of 640 pixels in the horizontal direction by 480 lines in the vertical direction, by a resizing circuit 107 and then compressed by a compression circuit 108 in a compression mode such as the Moving Picture Experts Group (MPEG) mode to be written to a memory 110 as compressed data via a memory controller 109. A system controller 118 reads the compressed data from the memory 110 via the memory controller 109, and a header, additional data, and the like necessary for decompression are added to the read data. Then, the output is recorded on a detachable recording medium 121 as a moving image file via a medium interface (I/F) 120.

The output from the signal processing circuit 106 is also input to a resizing circuit 122. The resizing circuit 122 resizes the size of the input image data to a size suitable for video encoding, for example, a size of 720 pixels in the horizontal direction by 240 lines in the vertical direction, and outputs the resized data. A video encoder 123 encodes the output from the resizing circuit 122 as video signals in, for example, the National Television System Committee (NTSC) or phase alternation by line (PAL) format. The output from the video encoder 123 is displayed on a display unit 124, such as a cathode-ray tube (CRT) or a liquid crystal display (LCD) panel, as an image on an electronic view finder that is recording moving images.

The output from the A/D converter 105 is also input to an automatic white balance (AWB) circuit 115. The AWB circuit 115 outputs a white balance coefficient to the signal processing circuit 106 in advance so that the color balance specified by the system controller 118 can be achieved. Simultaneously, the AWB circuit 115 outputs to the system controller 118 data indicating whether the white balance coefficient is adjusted so as to fall in a predetermined range (the white balance is locked) or is being changed with the change of scenes (the white balance is not locked).

The output from the A/D converter 105 is also supplied to a focus detecting circuit 116. The focus detecting circuit 116 extracts high-frequency components of the image of the subject from the digital video signals output from the A/D converter 105 and moves the focus lens 102 via a focus control circuit 112 so that the signal level of the high-frequency components is highest. The focus detecting circuit 116 also outputs to the system controller 118 data indicating whether the focus in a predetermined range is achieved (the focus is locked).

The output from the A/D converter 105 is also supplied to an exposure level detecting circuit 117. The exposure level detecting circuit 117 controls the exposure time in the imaging device 104 via an electronic-shutter control circuit 114 according to a program diagram specified by the system controller 118 in advance so that the exposure in the imaging device 104 is proper. Furthermore, the exposure level detecting circuit 117 controls the aperture stop 103 via an aperture stop control circuit 113 to control the amount of exposure in the imaging device 104 and outputs to the system controller 118 data indicating whether the exposure is controlled so as to fall in a predetermined range (automatic exposure is locked).

The output from the signal processing circuit 106 is also supplied to a scene determining circuit 125. The scene determining circuit 125 detects the change of scenes in video signals and outputs the determination result to the system controller 118.

The system controller 118 monitors the status of switches included in an operation unit 119. When a button for moving the zoom is pressed, the system controller 118 drives the zoom lens 101 in the tele or wide direction via a zoom control circuit 111 in response to the result of detecting the button.

Super-resolution processing according to an exemplary embodiment will now be described. Super-resolution processing is processing in which a higher-resolution image is generated from a plurality of lower-resolution images that overlap each other. A super-resolution image in an exemplary embodiment is a still image that is generated by performing super-resolution processing using a plurality of moving image frames obtained by image capturing.

Figure 2:
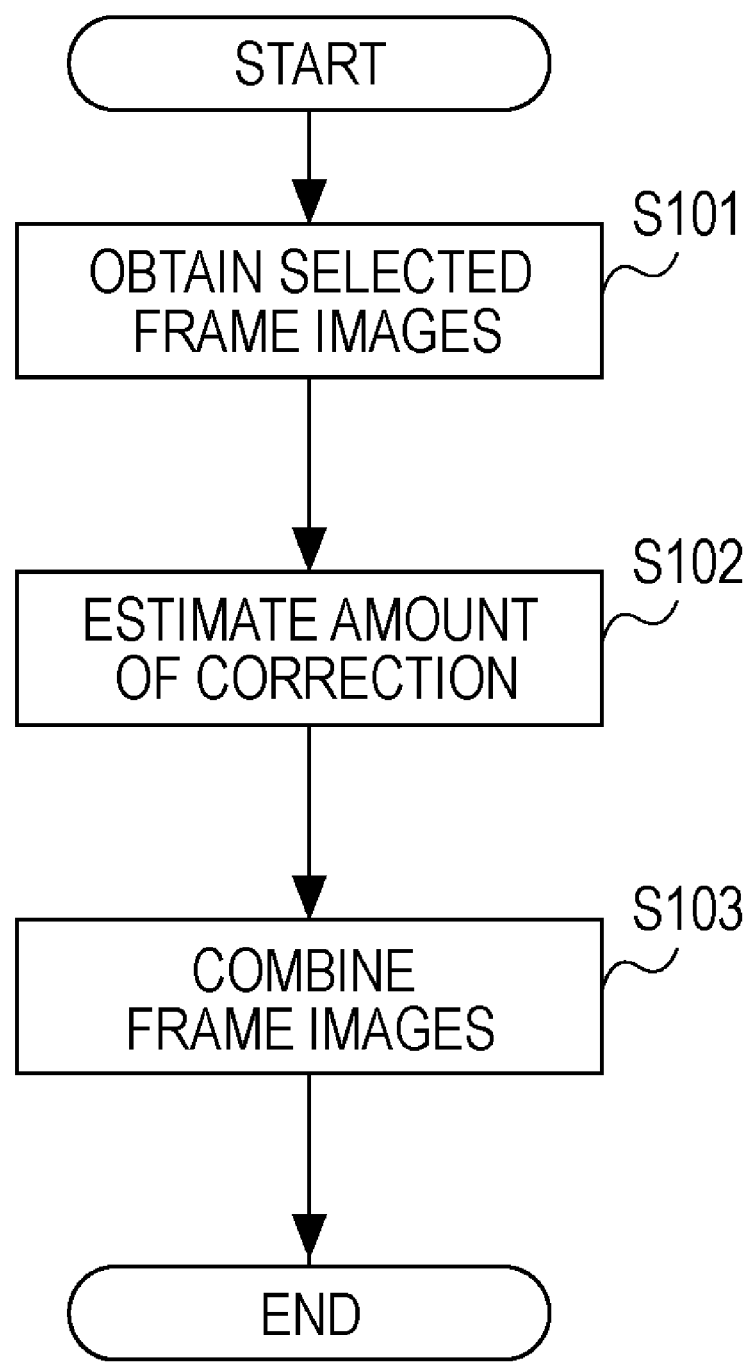
FIG. 2 is a flowchart showing super-resolution processing according to an exemplary embodiment.

FIG. 2 is a flowchart showing super-resolution processing according to an exemplary embodiment. The processing shown in this flowchart is performed by a moving-image playback unit described below.

In step S101, data of a plurality of frame images that are selected is obtained. In the present exemplary embodiment, for example, data of four selected frame images is obtained. The obtained data of the plurality of frame images is temporarily stored in the memory 110.

The data of the frame images is composed of gray scale data (hereinafter, also called pixel data) indicating gray scale values (hereinafter, also called pixel values) of individual pixels arranged in a dot matrix array. The pixel data includes, for example, red-green-blue (RGB) data or YCbCr data that includes luminance (Y), blue color difference (Cb), and red color difference (Cr). The pixel data depends on the type of the imaging device 104.

Figure 3:
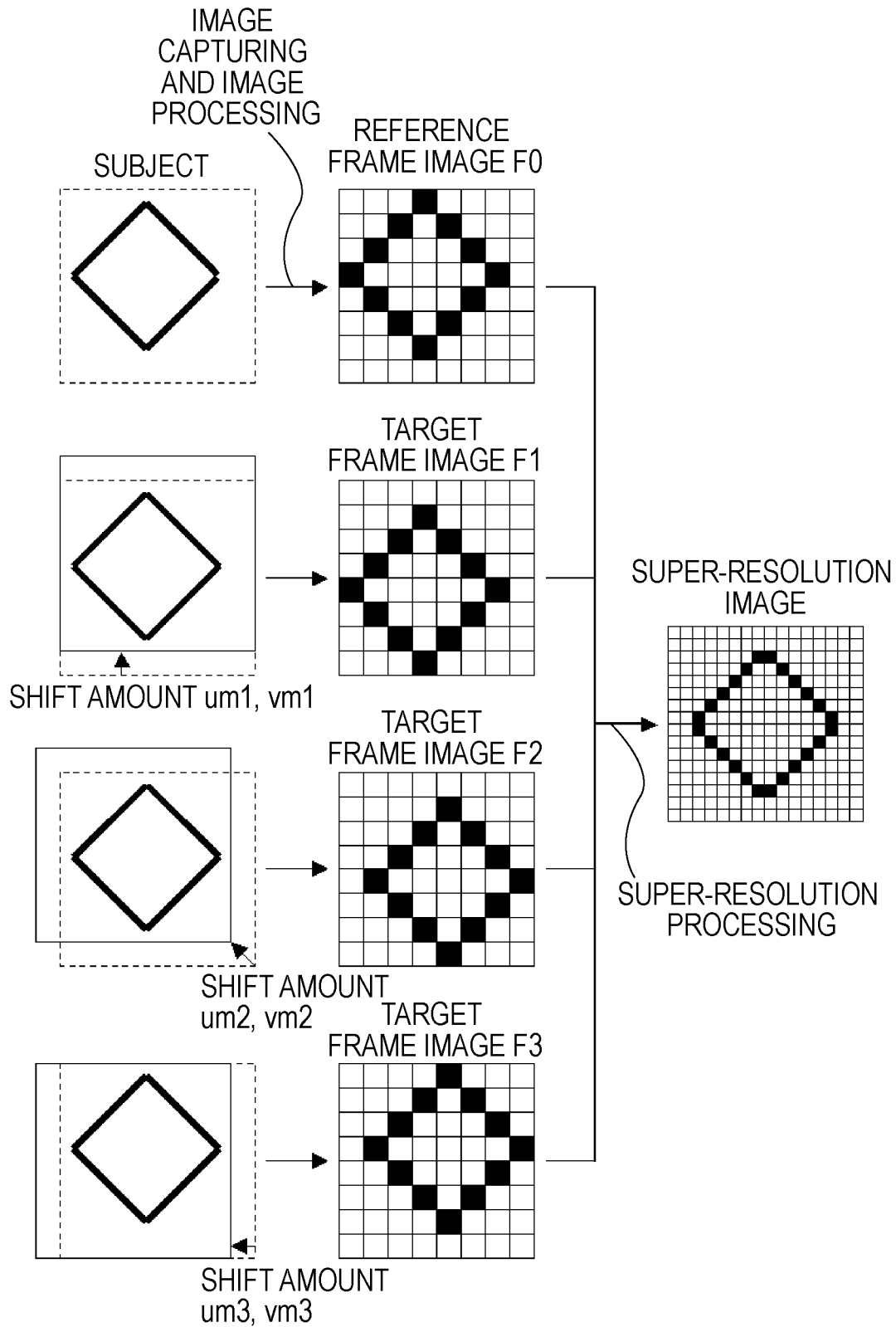
FIG. 3 is a first illustration showing frame images that are used in super-resolution processing and an image having been subjected to super-resolution processing.
Figure 4:
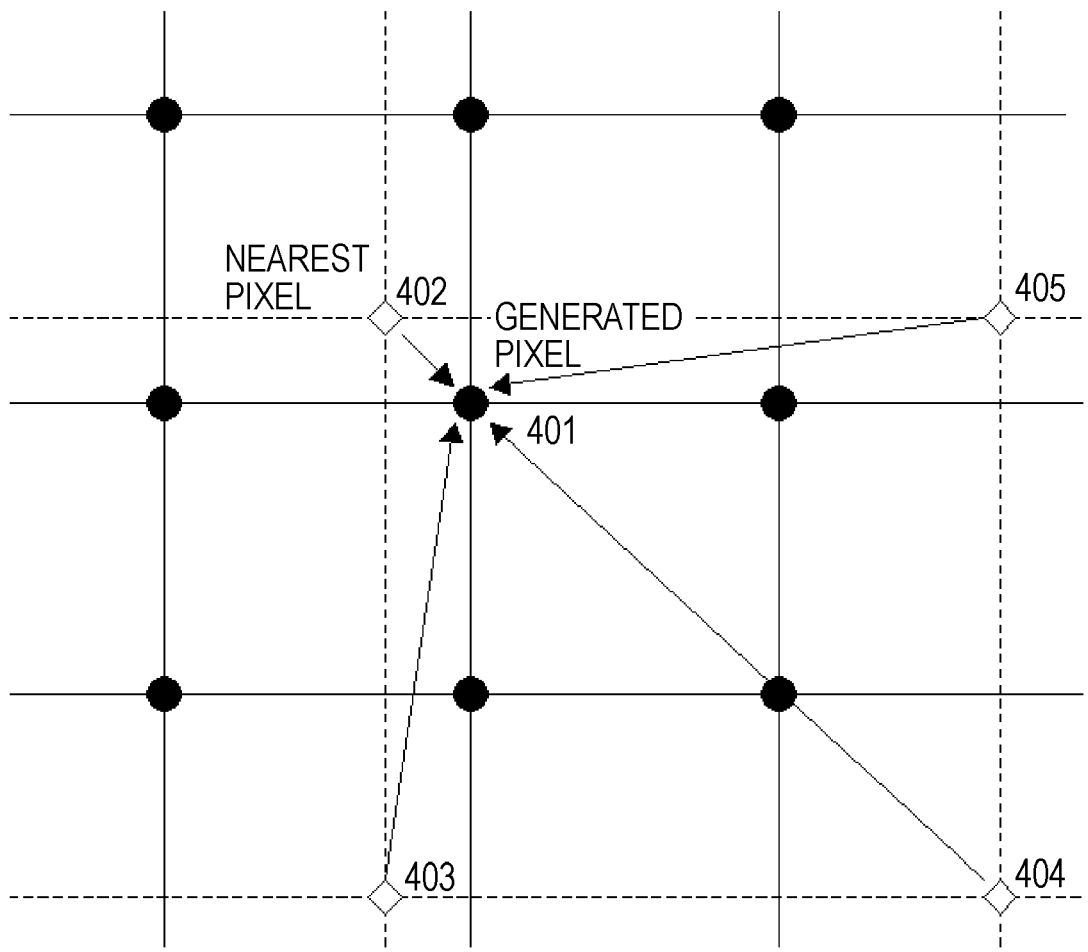
FIG. 4 is an illustration showing interpolation in super-resolution processing.

In the present exemplary embodiment, the data of a frame image is shown as multi-valued image data of one color, as shown in FIGS. 3 and 4, for the sake of clear illustration of super-resolution processing. In an embodiment, the image size is not the VGA size, and the data of a frame image includes sixty-four pixels of eight pixels in the horizontal direction by eight lines in the vertical direction.

In step S102, the amount of correction necessary to correct positional shifts between three frame images out of the obtained frame images is estimated. When the amount of correction is estimated, out of the foregoing four frame images, one frame image is set as a reference frame, and the other three frame images are set as target frames. In this arrangement, the amount of correction necessary to correct positional shifts between each target frame and the reference frame is estimated. In the present exemplary embodiment, out of the selected frame images, the first generated frame image is set as a reference frame, and the other three frame images are set as target frames.

In the following description, the number (hereinafter, called frame number) of each of the obtained four frames is represented by n (n=0, 1, 2, or 3), a frame having a frame number n is called frame n, and the image of the frame n is called frame image Fn. For example, a frame in which the frame number n is zero is called frame 0, and the image is called frame image F0. It is assumed that a frame 0 is the reference frame and frames 1 to 3 are the target frames. A frame image F0 that is the reference frame may be called reference frame image, and frame images F1 to F3 that are the target frames may be called target frame images.

The positional shifts in an image are expressed by a combination of a translational (horizontal or vertical) shift and a rotational shift. However, in the present exemplary embodiment, the description of a rotational shift is omitted.

FIG. 3 is an illustration showing frame images that are used in super-resolution processing and an image having been subjected to super-resolution processing. A subject, the reference frame image F0, and the target frame images F1 to F3, which are obtained by image capturing, are shown in FIG. 3. A dotted rectangle surrounding the subject shows the angle of view with which the reference frame image F0 is captured, and solid rectangles show the angles of view with which the target frame images F1 to F3 are captured.

In the present exemplary embodiment, the amount of translational shift in the horizontal direction and the amount of translational shift in the vertical direction are represented by um and vm, respectively. These amounts of shifts of a target frame image Fn (n=1 to 3) are represented by umn and vmn. For example, in the target frame image F1, translational shifts with respect to the reference frame image F0 in the vertical direction occurs, and the amount of the shift are represented by um1 and vm1, as shown in FIG. 3.

In order to combine the target frame images F1 to F3 and the reference frame image F0, the positional shifts of individual pixels in the individual target frame images F1 to F3 are corrected so that the shifts between the target frame images F1 to F3 and the reference frame image F0 are eliminated. The amount of correction of a translational shift in the horizontal direction and the amount of correction of a translational shift in the vertical direction, which are used in this correction, are represented by u and v, respectively. These amounts of correction of the target frame image Fn are represented by un and vn. For example, the amounts of correction of the target frame image F1 is represented by u1 and v1.

Correction means moving the positions of individual pixels of the target frame image Fn as much as un in the horizontal direction and vn in the horizontal direction. Thus, the correction amounts un and vn of the target frame image Fn respectively satisfy the relationships in equations:

$$un = -umn,$$

$$vn = -vmn.$$

For example, the correction amounts u1 and v1 of the target frame image F1 satisfy the relationships in equations:

$$u1 = -um1,$$

$$v1 = -vm1.$$

Accordingly, the shifts between the target frame image F1 and the reference frame image F0 can be eliminated by correcting the positions of individual pixels in the target frame image F1 using the correction amounts u1 and v1. Similarly, regarding the target frame images F2 and F3, correction is performed using the correction amounts u2 and v2 and the correction amounts u3 and v3, respectively.

The correction amounts un and vn of the target frame image Fn are calculated on the basis of the image data of the reference frame image F0 and the image data of the target frame image Fn. A predetermined calculation formula by, for example, a pattern matching method, a gradient method, and a least-squares method is used in this calculation. The calculated correction amounts un and vn are stored in a predetermined area in the memory 110 as translational correction amount data un and vn.

In step S103, a high-resolution still image data is generated by combining the image data of the reference frame image F0 and the image data of the corrected target frame images F1 to F3.

In the illustration of the present exemplary embodiment, the unit amount of shift of each of the target frame images F1 to F3 is one pixel in the horizontal direction and/or the vertical direction in FIG. 3 for the sake of clear illustration. However, in actual image capturing, a shift less than one pixel can occur, and high-resolution processing can be achieved using a minute shift.

Thus, some of pixels (hereinafter, also called generated pixels) that constitute a still image to be generated may not exist in a reference frame image and target frame images.

High-resolution processing is performed on such pixels, while images are combined, by performing predetermined interpolation using pixel data (gray scale data indicating gray scale values) indicating the pixel values of pixels around these generated pixels. Various types of interpolation can be used, for example, a bi-linear method, a bi-cubic method, or a nearest neighbor method.

For example, when bi-linear interpolation is used, a frame image that includes a nearest pixel 402 that is nearest to the position of a generated pixel 401 is first selected from a reference frame image and target frame images. Then, four pixels surrounding the position of the generated pixel 401 in the selected frame image are determined as being surrounding pixels 402 to 405, as shown in FIG. 4, and the data values of the surrounding pixels 402 to 405, to which predetermined weights are assigned, are averaged to obtain the data value of the generated pixel 401.

For example, the super-resolution image shown in FIG. 3, which has twice the resolution as is provided in the original images, can be obtained by repeating the foregoing process on the positions of individual generated pixels. The scaling factor of the resolution is not limited to two and may be another value. An accurate super-resolution image can be obtained by increasing the number of frames the data values of which are used in interpolation.

While super-resolution processing according to the present exemplary embodiment has been described, due to the conditions in which images are captured, some frame images may be suitable for super-resolution processing, and other frame images may not be suitable for super-resolution processing. Frame images to which super-resolution processing is not suitably applied will now be described briefly with reference to FIG. 5. Frame images shown in FIG. 5 correspond to the frame images shown in FIG. 3.

In FIG. 5, a target frame image F1 corresponds to the target frame image F1 shown in FIG. 3 and is the image of a scene where the level of detected value of light metering changes. In such a scene, changes occur in intense white areas and intense black areas in the subject. In the case of a color image, in a scene where the level of detected white balance changes, the hue changes even in one subject. Thus, a state similar to that of the target frame image F1 shown in FIG. 5 occurs.

A target frame image F2 corresponds to the target frame image F2 shown in FIG. 3 and is an image that is out of focus and blurred.

A target frame image F3 is an image in which the subject (the scene) changes. Even when the zoom value is significantly changed, a state similar to that of the target frame image F3 shown in FIG. 5 occurs.

When such frame images are used in super-resolution processing, the shifts between these frame images and the reference frame image are large, and thus the accuracy in estimation of the correction amount in step S102 decreases. The accuracy in combining frame images in step S103 using the result of estimating the correction amount also decreases.

Thus, in order to sufficiently achieve the effect of super-resolution processing, frame images need to be identified, in which the amounts of shifts of the frames are appropriate, and various types of detected image capturing operation and condition for image capturing, which cause changes in captured images, are stable.

In the present exemplary embodiment, the system controller 118 adds to the compressed data a super-resolution flag, corresponding to each field of image, for frame identification in addition to the additional data.

Figure 6:
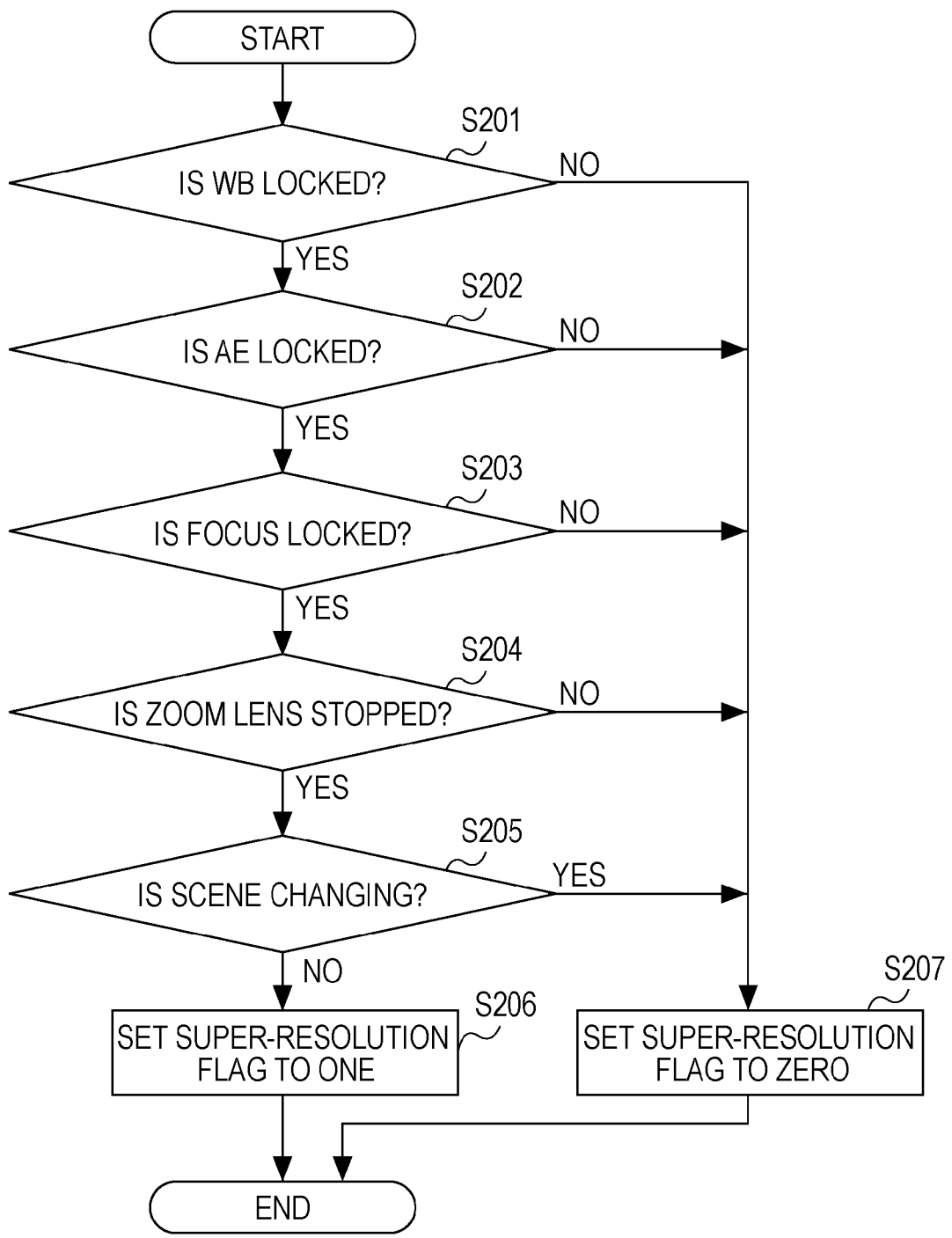
FIG. 6 is a flowchart showing the process of determining a value of a super-resolution flag.

The process of determining the value of a super-resolution flag will now be described with reference to FIG. 6. In step S201 in FIG. 6, it is determined whether the white balance is locked when a target field image is captured.

When it is determined that the white balance is locked, the process proceeds to step S202. Otherwise, the process proceeds to step S207. In step S202, it is determined whether the automatic exposure is locked when the target field image is captured.

When it is determined that the automatic exposure is locked, the process proceeds to step S203. Otherwise, the process proceeds to step S207. In step S203, it is determined whether the focus is locked when the target field image is captured.

When it is determined that the focus is locked, the process proceeds to step S204. Otherwise, the process proceeds to step S207. In step S204, it is determined whether the zoom lens is stopped when the target field image is captured.

When it is determined that the zoom lens is stopped, the process proceeds to step S205. Otherwise, the process proceeds to step S207. In step S205, it is determined whether the scene is changing when the target field image is captured.

When it is determined that the scene is not changing, the process proceeds to step S206. Otherwise, the proceeds to step S207. In step S206, it is determined that the super-resolution flag is set to one. On the other hand, in step S207, it is determined that the super-resolution flag is set to zero.

In this way, during the playback process, a super-resolution flag set to one is recorded as additional data for a field image that is suitable for super-resolution processing, and a super-resolution flag set to zero is recorded as additional data for a field image that is not suitable for super-resolution processing. In the present exemplary embodiment, the similarities between consecutive field images are determined, and a super-resolution flag corresponding to the determination result is added, as described above. The similarities between consecutive field images mean similarities in a variation in white balance, a variation in exposure, a variation in focus, the amount of movement of the zoom lens, and a variation in a scene between consecutive field images. In the present exemplary embodiment, all of these similarities are checked. Alternatively, some of these similarities may be checked, or other similarities may be checked.

Accordingly, in the present exemplary embodiment, a field image suitable for super-resolution processing can be readily identified on the basis of the super-resolution flag.

Figure 7:
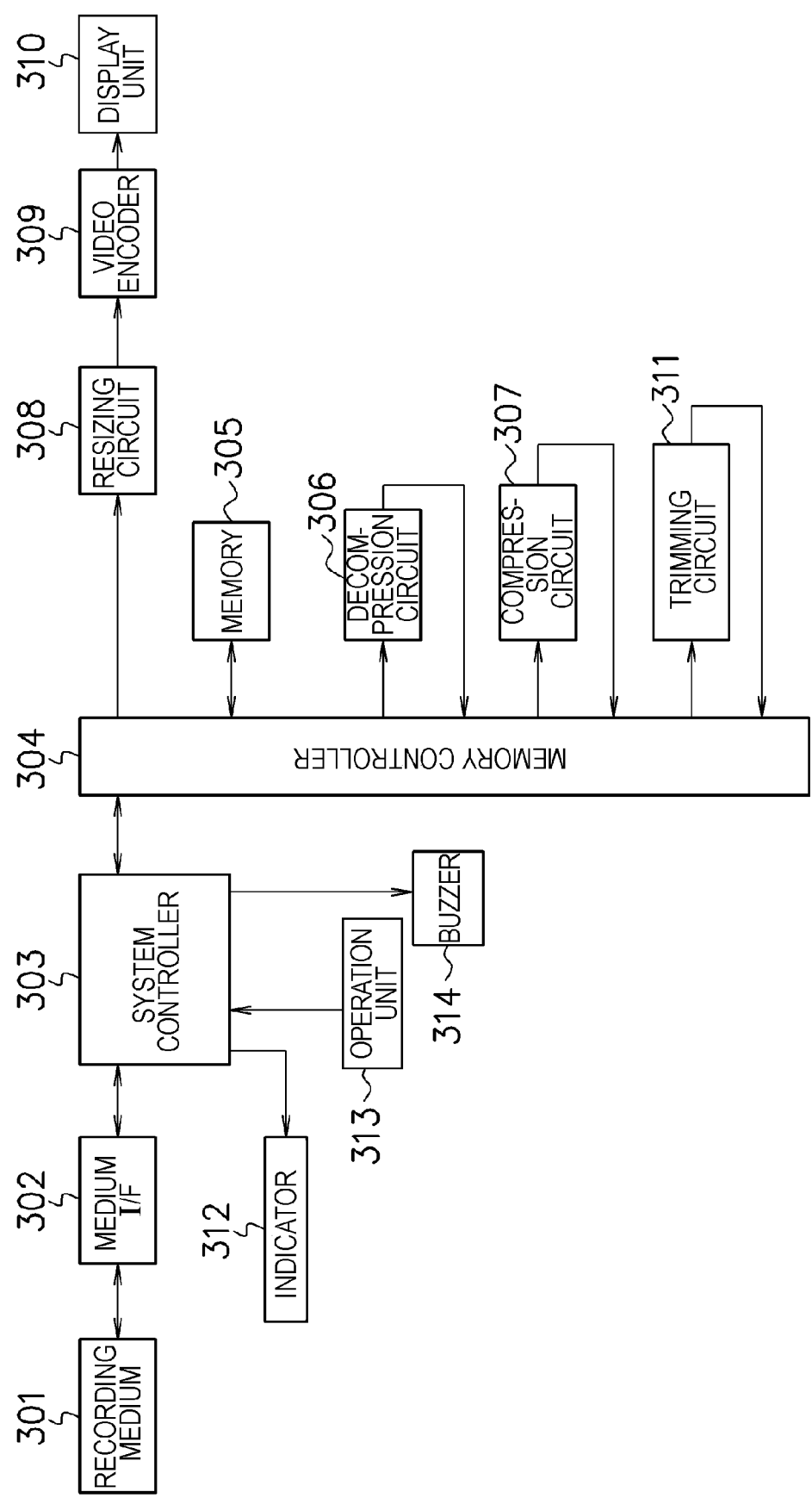
FIG. 7 is an illustration showing components of a moving-image playback unit in the image capturing apparatus according to the exemplary embodiment of the present invention.

The operation of playing back moving images in which a super-resolution flag is recorded as additional data for each field image will now be described with reference to FIG. 7. FIG. 7 is an illustration showing components of a moving-image playback unit in the image capturing apparatus according to the present exemplary embodiment.

In FIG. 7, a system controller 303 reads a moving image file recorded on a detachable recording medium 301 via a medium I/F 302, and the moving image file is processed. For example, header data is separated from moving image data in the moving image file. Then, the header data and the moving image data are written to a memory 305 via a memory controller 304.

The moving image data is read from the memory 305 according to an instruction from the system controller 303 and decompressed into a field image in a decompression circuit 306. Then, the field image is written back to the memory 305. The field image is read from the memory 305 according to an instruction from the system controller 303, and a resizing circuit 308 resizes the size of the field image to a size suitable for video encoding, for example, a size of 720 pixels in the horizontal direction by 240 lines in the vertical direction. The output from the resizing circuit 308 is encoded as video signals by a video encoder 309, and images are displayed on a display unit 310 that includes, for example, a CRT or an LCD panel.

Moving images are played back on the display unit 310 by the system controller 303 repeating the series of these steps at the field recording rate of the moving image file.

The process of playing back moving images in a suspended state is as follows: decompression of moving image data by the decompression circuit 306 is suspended, and the resizing circuit 308 repeatedly resizes the last generated field image remaining in the memory 305. Then, the video encoder 309 encodes the output from the resizing circuit 308 as video signals. An image based on the video signals is repeatedly displayed on the display unit 310.

Figure 8:
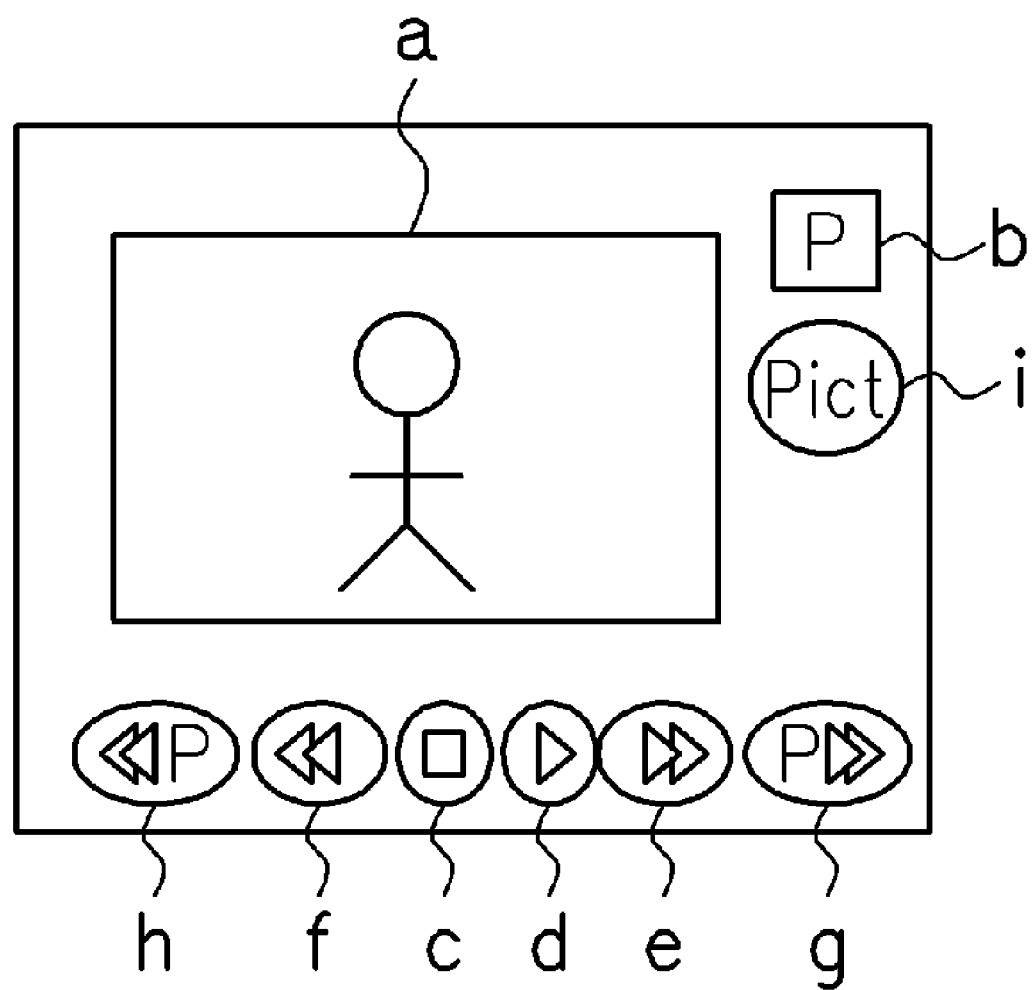
FIG. 8 is an external schematic view of the body of the moving-image playback unit according to the exemplary embodiment of the present invention.

The operations corresponding to buttons in an operation unit 313 will now be described. FIG. 8 is an external schematic view of the body of the moving-image playback unit according to the present exemplary embodiment. A panel a is the image display surface of the display unit 310. A lamp b serves as an indicator 312. A button c is a stop button. A button d is a play button. A button e is a fast-forward button. A button f is a fast-rewind button. A button g is a forward-search button for searching for a scene suitable for super-resolution processing in the forward direction. A button h is a backward-search button for searching for a scene suitable for super-resolution processing in the backward direction. A button i is a super-resolution-processing execute button.

Images are displayed on the panel a. When values of super-resolution flags corresponding to at least a predetermined number of consecutive field images are one during playback of moving images or when values of super-resolution flags corresponding to the currently displayed field image and at least a predetermined number of consecutive field images preceding and following the currently displayed field image are one during suspension of moving images, the indicator 312 is turned on. Otherwise, the indicator 312 is turned off.

When the button c is pressed, the system controller 303 stops playback of moving images. When the button d is pressed in a state in which playback of moving images is stopped, the system controller 303 starts playback of moving images. When the button d is pressed during playback of moving images, the system controller 303 suspends playback of moving images. When the button e is pressed, the system controller 303 fast-forwards moving images. When the button f is pressed, the system controller 303 fast-rewinds moving images. When the button g is pressed, the system controller 303 suspends playback of moving images and searches for a scene suitable for super-resolution processing in the forward direction. When the button h is pressed, the system controller 303 suspends playback of moving images and searches for a scene suitable for super-resolution processing in the backward direction.

The process of searching for a scene suitable for super-resolution processing will now be described with reference to FIG. 9. In step S501, the display image is suspended. Then, in step S502, the moving-image pointer of moving image data is moved until the value of a super-resolution flag becomes zero. At this time, in the case of a forward search, the moving-image pointer is moved forward, and in the case of a backward search, the moving-image pointer is moved backward.

Then, in step S503, the moving-image pointer is moved until the value of a super-resolution flag becomes one. At this time, in the case of a forward search, the moving-image pointer is moved forward, and in the case of a backward search, the moving-image pointer is moved backward.

Then, in step S504, it is determined whether the value of a super-resolution flag is kept at one for a predetermined number of consecutive field images following the moving-image pointer, for example, twenty consecutive field images. When it is determined that the value of a super-resolution flag is not kept at one for twenty consecutive field images, the process goes back to step S502, and a segment that includes twenty or more consecutive field images each having a super-resolution flag set to one is searched for.

When it is determined in step S504 that the value of a super-resolution flag is kept at one for twenty or more consecutive field images, the process proceeds to step S505. In step S505, the current field image specified by the moving-image pointer is decompressed to be displayed as a suspended image of moving images. Then, in step S506, the indicator 312 is turned on.

When the button i is pressed in a state in which playback of moving images is suspended, the super-resolution flags corresponding to twenty field images preceding and twenty field images following the currently displayed field image are checked. Then, it is determined whether the value of a super-resolution flag is kept at one for twenty or more consecutive field images out of the currently displayed field image, the preceding twenty field images, and the following twenty field images.

When it is determined that the value of a super-resolution flag is not kept at one for twenty or more consecutive field images, super-resolution processing is not performed, and, for example, a buzzer 314 sounds a beep to notify the user that super-resolution processing is not performed. On the other hand, when it is determined that the value of a super-resolution flag is kept at one for twenty or more consecutive field images, super-resolution processing is performed.

In super-resolution processing, the system controller 303 sequentially reads data corresponding to the twenty consecutive field images in the moving image file from the recording medium 301 via the medium I/F 302 and separates the data into a header section and a moving image data section. Then, the header section and the moving image data section are written to the memory 305 via the memory controller 304, and the written moving image data is sequentially decompressed by the decompression circuit 306 to be written to the memory 305.

Then, position estimation, high-bandwidth interpolation, and weighted sum calculation are performed on the decompressed twenty field images to generate an image having been subjected to super-resolution processing.

After unnecessary parts around the image having been subjected to super-resolution processing are trimmed by a trimming circuit 311, the image is compressed by a compression circuit 307 to generate compressed still image data, and the compressed still image data is written to the memory 305. The system controller 303 reads the compressed still image data from the memory 305, adds a header to the data, and records the resulting data on the recording medium 301 as a still image file.

In this way, when the button i is pressed, a still image is generated from a moving image file by super-resolution processing and recorded as a still image file separate from the moving image file.

Accordingly, in the present exemplary embodiment, a position suitable for super-resolution processing can be automatically located. Furthermore, since images are played back in a suspended state at a position suitable for super-resolution processing, the user can determine, taking enough time, whether super-resolution processing should be performed on images that are being played back.

In the present exemplary embodiment, super-resolution processing is performed by the moving-image playback unit in the image capturing apparatus. However, the present invention is not limited to this exemplary embodiment, and super-resolution processing may be performed by a dedicated image-playback unit. Furthermore, the functions of the moving-image playback unit may be implemented via application software on a personal computer.

That is to say, an object of the present invention is also achieved by an embodiment in which a recording medium that stores program codes of software that performs the functions according to the aforementioned exemplary embodiment is provided to a system or an apparatus and a computer included in the system or the apparatus reads and executes the program codes stored in the recording medium.

In this case, the program codes read from the recording medium perform the functions according to the aforementioned exemplary embodiment, and thus the present invention includes the program codes and the recording medium storing the program codes.

The following media can be used as recording media to supply the program codes: for example, a flexible disk, a hard disk, an optical disk, a magneto-optical disk, a compact disk read only memory (CD-ROM), a compact disk recordable (CD-R), a magnetic tape, a nonvolatile memory card, and a ROM.

Furthermore, an operating system (OS) operating on a computer may execute some or all of the actual processing to perform the functions of the aforementioned exemplary embodiment according to instructions from the program codes.

Furthermore, the program codes read from the recording medium may be written to a memory included in, for example, a function expansion unit connected to a computer. Then, for example, a CPU may execute the actual processing to perform the functions of the aforementioned exemplary embodiment according to instructions from the program codes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-313098 filed Oct. 27, 2005 and No. 2006-241337 filed Sep. 6, 2006, which are hereby incorporated by reference herein in their entirety.

What is claimed is:

1. An apparatus comprising:
at least one processor coupled via a bus to a memory, the processor being programmed to control one or more of:
an image capturing unit that captures an image and output image data of the image;
a setting unit that sets control parameters for the image capturing unit capturing each piece of image data;
a controlling unit that controls an image capturing of the image capturing unit using the control parameters set by the setting unit;
a determining unit that determines whether image capturing conditions concerning resolution processing generating a high-resolution image using a plurality of image data are satisfied for each piece of image data, wherein the image capturing conditions include conditions concerning similarities of the control parameters set by the setting unit between consecutive pieces of the image data;
an adding unit that adds data corresponding to a result of determination made by the determining unit to each piece of the image data; and
a recording unit that records a plurality of the image data output by the adding unit as a moving image file,
wherein the setting unit varies the control parameters set to each piece of the image data among the plurality of pieces of the image data of the moving image file, and consecutive pieces of the image data which satisfy the image capturing conditions can be identified.

2. The apparatus according to claim 1, further comprising:
a resolution processing unit that performs the resolution processing to generate a high-resolution still image using a plurality of image frames of the moving image file.

3. The apparatus according to claim 1, wherein the conditions concerning similarities of control parameters for an image capture unit capturing each piece of image data between consecutive pieces of the image data include at least one of a condition concerning variation in white balance, a condition concerning variation in exposure, a condition concerning variation in focus, and a condition concerning the amount of movement of a zoom lens between consecutive pieces of the image data.

4. The apparatus according to claim 1, further comprising:
a detecting unit that detects positions of at least two consecutive pieces of the image data that satisfy the image capturing conditions concerning resolution processing.

5. The apparatus according to claim 4, further comprising:
a specifying unit that specifies a direction in which the detecting unit searches for consecutive pieces of the image data.

6. The apparatus according to claim 4, further comprising:
a suspend-playback unit that plays back the image data at the positions detected by the detecting unit while the image data is being suspended.

7. A method comprising:
capturing an image and output image data of the image by an image capturing unit;
setting control parameters for the image capturing unit capturing each piece of image data;
controlling an image capturing of the image capturing unit using the control parameters;
determining whether image capturing conditions concerning resolution processing generating a high-resolution image using a plurality of image data are satisfied for each piece of image data, wherein the image capturing conditions include conditions concerning similarities of the control parameters between consecutive pieces of the image data;
adding data indicating whether the image capturing conditions are satisfied to each respective piece of the image data; and
recording a plurality of the image data to which the data indicating whether the image capturing conditions are satisfied are added as a moving image file,
wherein the control parameters set for each piece of the image data is varied among the plurality of pieces of the image data of the moving image file, and consecutive pieces of the image data which satisfy the image capturing conditions can be identified.

8. The method according to claim 7, wherein each piece of the image data corresponds to an image frame of the moving image file.

9. The method according to claim 8, further comprising:
performing the resolution processing to generate a still image using a plurality of image frames of the moving image file.

10. The method according to claim 7, wherein the conditions concerning similarities of control parameter for an image capturing unit capturing the each piece of image data between consecutive pieces of the image data include at least one of a condition concerning variation in exposure, a condition concerning variation in focus, and a condition concerning the amount of movement of a zoom lens between consecutive pieces of the image data.

11. The method according to claim 7, further comprising:
reading the image data from the moving image file; and
detecting a position of the moving image file at which at least two consecutive pieces of the image data satisfy the image capturing conditions.

12. A non-transitory computer-readable recording medium that stores instructions which, when executed by an apparatus, causes the apparatus to perform operations comprising:
capturing an image and output image data of the image by an image capturing unit;
setting control parameters for the image capturing unit capturing each piece of image data;
controlling an image capturing of the image capturing unit using the control parameters;
determining whether image capturing conditions concerning resolution processing generating a high-resolution image using a plurality of image data are satisfied for each piece of image data, wherein the image capturing conditions include conditions concerning similarities of the control parameters between consecutive pieces of the image data;
adding data indicating whether the image capturing conditions are satisfied to each respective piece of the image data; and
recording a plurality of the image data to which the data indicating whether the image capturing conditions are satisfied are added as a moving image file,
wherein the control parameters set for each piece of the image data is varied among the plurality of pieces of the image data of the moving image file, and consecutive pieces of the image data which satisfy the image capturing conditions can be identified.

\* \* \* \* \*